United States Patent [19]

Martin et al.

[11] Patent Number: 4,676,957

[45] Date of Patent: Jun. 30, 1987

[54] ELECTROLYTIC SEPARATION OF CERIUM/RARE EARTH VALUES

[75] Inventors: Michel Martin; Alain Rollat, both of Paris, France

[73] Assignee: Rhone-Poulenc Specialites Chimiques, Courbevoie, France

[21] Appl. No.: 843,513

[22] Filed: Mar. 25, 1986

[30] Foreign Application Priority Data

Mar. 25, 1985 [FR] France ............................ 85 04372

[51] Int. Cl.⁴ ............................................. C01F 17/00
[52] U.S. Cl. .................................. 423/21.5; 204/130; 204/101; 204/233
[58] Field of Search .............. 204/130, 101, 233, 103, 204/265, 257, 258, 266, 263; 75/101 BE, 121; 423/21.5

[56] References Cited

U.S. PATENT DOCUMENTS 4,417,965 11/1983 Inoue .................................... 204/164
4,443,305 4/1984 Haynes ............................. 204/59 M
4,530,745 7/1985 Komatsu et al. ..................... 204/130

Primary Examiner—R. L. Andrews
Attorney, Agent, or Firm—Burns, Doane, Swecker & Mathis

[57] ABSTRACT

Cerium and rare earth values are separated from an aqueous medium comprised thereof, by (i) anodically electrolytically treating such aqueous medium and oxidizing the Ce (III) values therein to Ce (IV) values, (ii) extracting said electrolyzed aqueous medium with a selective organic extractant for said Ce (IV) values, and permitting the extracted medium to separate into an organic phase enriched in Ce (IV) values and a product aqueous phase enriched in rare earth values, (iii) reducing the Ce (IV) values in said organic phase to Ce (III) values and admixing same with an aqueous medium, and (iv) permitting said admixture to separate into an organic phase and a product aqueous phase enriched in Ce (III) values.

19 Claims, 5 Drawing Figures

ELECTROLYTIC SEPARATION OF CERIUM/RARE EARTH VALUES

BACKGROUND OF THE INVENTION

1. Field of the Invention

The present invention relates to a process for the separation of cerium and rare earth values contained in an aqueous phase thereof, and particularly relates to the separation of cerium from other rare earth (RE) values, said elements comprising an aqueous solution thereof, notably a nitric solution.

2. Description of the Prior Art

Rare earth metals are typically found associated in various minerals such as monazite, bastnaesite or xenotime, for example. One means for separating the different rare earth values from each other consists of carrying out successive liquid/liquid extractions of solutions of salts of said rare earths.

Processes are already known to this art which enable such a separation. See, for example, U. S. Pat. No. 2,564,241. Typically, these processes are based on the selective extraction of cerium (IV) with respect to RE (III) when using certain organic solvents, such as tributylphosphate. Thus, an aqueous phase containing cerium (IV) and RE (III) is contacted with a solvent of the aforementioned type which selectively extracts the cerium, while the RE (III) remains in the aqueous raffinate. To subsequently extract the cerium from such organic solvent, it is converted into oxidation state (III) by chemical reaction and the organic phase is next extracted with an aqueous phase, wherefrom the cerium values are recovered.

Although such prior art processes enable the efficient separation of cerium, they are not without disadvantage. In effect, the use of a chemical reducing agent necessarily entails the introduction of extraneous impurities, particularly in the form of foreign organic or metallic species. In addition, extrinsic reagents are consumed over the course of the operation. Also, it is frequently necessary to utilize rather exotic apparatus.

SUMMARY OF THE INVENTION

Accordingly, a major object of the present invention is the provision of an improved process, which is both simple and efficient vis-a-vis the processes known to the prior art, for separating cerium values from other rare earth values, and ultimately providing very high purity cerium.

Briefly, in a first embodiment thereof, the subject process for separating cerium and rare earth values from beginning aqueous phases comprised thereof includes the following stages:

($a_1$) said aqueous phase containing the rare earths and cerium (III) is transferred into the anode compartment of an electrolytic cell, whereby the cerium (III) is oxidized into cerium (IV);

($b_1$) the aqueous phase emanating from the aforesaid anode compartment is contacted with an organic phase which comprises an extractant for cerium (IV), whereby, after phase separation, an organic phase enriched in cerium (IV) and an aqueous phase enriched in rare earths are provided;

($c_1$) all or a portion of the organic phase enriched in cerium (IV) is transferred into the cathode compartment of the aforementioned electrolytic cell, an aqueous nitric solution is charged into said compartment and an intimate mixture of said aqueous phase and the organic phase is formed, whereby the cerium (IV) is reduced to cerium (III); and ($d_1$) the mixture recovered from the cathode department is separated into an aqueous phase enriched in cerium (III), which constitutes desired final product, and an organic phase.

In a second embodiment according to this invention, the subject process comprises the following stages:

($a_2$) the aqueous phase containing the rare earths and cerium (III) is transferred into the anode compartment of an electrolytic cell, whereby the cerium (III) is oxidized into cerium (IV);

($b_2$) the aqueous phase emanating from the aforesaid anode compartment is contacted with an organic phase which comprises an extractant for cerium (IV), whereby, after phase separation, an organic phase enriched in cerium (IV) and an aqueous phase enriched in rare earths are provided;

($c_2$) the cathode compartment of the aforementioned electrolysis cell is charged with an aqueous nitric phase, whereby a gas containing $NO_x$ is released;

($d_2$) the organic phase enriched in cerium (IV) resulting from stage ($b_2$) is contacted with the aforesaid flow of gas, whereby the cerium (IV) is reduced to cerium (III); and ($e_2$) the organic phase emanating from stage ($d_2$) is contacted with an aqueous phase, whereby, after phase separation, an aqueous phase enriched in cerium (III) and constituting the desired final product, and an organic phase essentially devoid of cerium values, are obtained.

DETAILED DESCRIPTION OF THE PREFERRED EMBODIMENTS OF THE INVENTION

Figure 1:
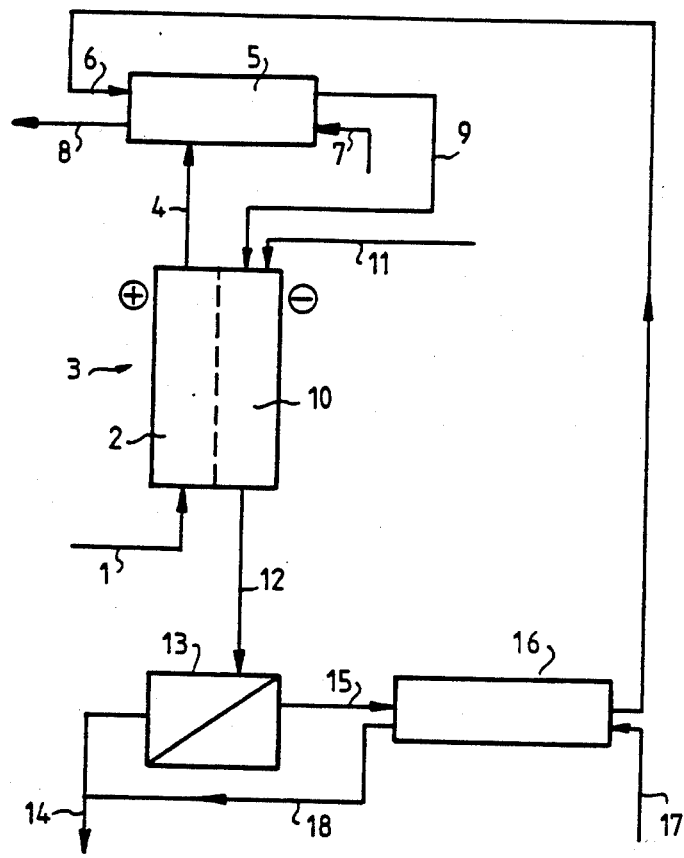
FIG. 1 is a schematic view of apparatus suitable for carrying out the first embodiment of the invention, in a first variant thereof.

More particularly according to the present invention, the subject process begins with an aqueous phase containing cerium and rare earth values in the oxidation state (III).

Advantageously, an aqueous nitric solution is selected.

The first sequence in the process of the invention, regardless of which embodiment under consideration, entails oxidizing the cerium to the oxidation state (IV). This oxidation is effected by means of electrolysis, by charging the aqueous solution into the anode compartment of an electrolytic cell.

The electrolytic cell used for carrying out the process of the invention is advantageously a cell fitted with a separator of known type. As regards the separator, porous materials such as ceramics, or plastics made porous by sintering or by the introduction of a blowing agent, or an ion exchange membrane, are suitable therefor. Among these separators, a cation exchange membrane is preferred, preferably consisting of a perfluorinated polymer bearing sulfonic acid functions. The cathode typically consists of graphite, or preferably of a metal and more particularly of titanium, platinum plated titanium, or titanium coated with palladium. The anode may consist of a variety of different metals, such as titanium, titanium coated with platinum, iridium, or a titanium/noble metal alloy. The configuration of the cell is typically of the flat type, having a large electrode surface area and a small interspace between the electrodes. In an industrial embodiment, a battery of electrolytic elements mounted in series in a well known multicell apparatus of the filter press type, is advantageously used. In order to facilitate the electrochemical reactions, it is possible to judiciously increase the active surface of the electrodes, or to provide for vigorous agitation of the solutions by means of a set of baffles.

In the anode compartment, the cerium is electrolytically converted into the oxidation state (IV), while the rare earths remain in oxidation state (III).

The aqueous solution recovered from the anode compartment of the cell is then contacted with an organic phase adopted to extract cerium (IV) values.

The conditions for such extraction are well known to this art. They are summarized below:

The organic phase comprises an extractant. This extractant must be capable of selectively extracting cerium (IV), while the RE (III) must remain in the aqueous phase. In general, all solvating agents which cannot be oxidized by cerium (IV) may be used. In particular, the extractant is advantageously a phosphate, phosphonate, phosphinate, phospine oxide, or sulfoxide.

Also representative of the extractant are the mono- or dialkylphosphoric, alkylphosphonic, alkylphosphinic, and alkylphenylphosphonic acids.

The aforesaid extractants may be used either alone or in admixture. More particularly, the trialkyl phosphates and specifically tributylphosphate (TBP) are the preferred extractants.

The organic phase contains, depending upon the particular case, an organic diluent that is inert with respect to the extractants in order to improve the hydrodynamic properties of the organic phase. Numerous organic solvents or mixtures thereof may be used as appropriate diluents. However, in the present case it is necessary to select a diluent which is not oxidized by cerium (IV).

Exemplary thereof, the aliphatic hydrocarbons and halogenated hydrocarbons are representative.

The contacting of the two phases may be effected either cocurrently or countercurrently, in any suitable apparatus of the mixer-decanter type, for example.

Following the separation of the phases, an organic phase enriched in cerium (IV) and an aqueous phase enriched in RE (III) and substantially free of cerium values, are obtained.

The organic phase may subsequently be subjected to two different treatments according to the invention.

According to a first embodiment, the organic phase is transferred into the cathode compartment of the electrolytic cell described above.

Simultaneously with the passage of the organic phase through the cell, an aqueous nitric solution is circulated within the same cathode department.

The aqueous phase is typically a solution of nitric acid, preferably having a concentration of at least 1N and even more preferably at least 4N. It may also be a weakly acidic aqueous nitric solution, approximately 0.5 to approximately 2N, for example, based on nitrates, in particular ammonium, alkali or alkaline earth metal nitrates or cerium nitrate.

The operation is carried out by forming an intimate admixture of the aqueous nitric phase and the organic phase in the cathode compartment. The mixture may be obtained by circulating the phases at an adequate velocity and also by placing turbulence promoters in the compartment. In view of the acidity of the aqueous phase and the nature of the cathode, the aqueous phase is reduced in NO and $NO_2$ values, said nitrogen oxides in turn reducing the cerium (IV) into cerium (III).

The mixture containing the cerium is separated at the outlet of the electrolytic cell into an aqueous phase enriched in cerium (III) and an organic phase. Such a separation may be carried out in any suitable apparatus.

Generally, the organic phase is recycled to the extraction stage. Prior to recycling, it is advantageous to wash it with an aqueous phase such as to recover the small amount of cerium (III) that could remain in the organic phase during the separation of the mixture. The aqueous phase obtained after the separation of the phases is subsequently combined with the aqueous phase enriched in cerium (III) obtained in the previous separation.

The aqueous phase used for the washing may be water, or a dilute aqueous solution of nitric acid.

The invention further comprises a second embodiment in which the organic phase enriched in cerium (IV) after the liquid/liquid extraction is not transferred into the electrolytic cell. In this second embodiment, in the cathode compartment of the cell, only a flowstream of an aqueous nitric phase of the same nature as described above, is established and circulated. A gas containing nitrogen oxides, $NO_x$, is then released in said compartment. The cathode department is operated under conditions close to those defined above, such that the $NO_x$ gases are essentially NO and $NO_2$ oxides. The gaseous flowstream is subsequently contacted, in a reactor, with the organic phase enriched in cerium (IV). An intimate admixture of the gas and the organic phase is effected in the reactor by means of suitable agitation. Following this treatment, an organic phase enriched in cerium (III) is recovered. This organic phase is back or re-extracted with an aqueous phase which may be either water or a dilute aqueous solution of nitric acid. After the separation of the phases, an aqueous phase enriched in cerium (III) and which constitutes the desired production is then obtained, together with an organic phase substantially free of cerium.

Generally, this organic phase is recycled into the stage of extraction of the aqueous phase enriched in cerium (IV), emanating from the anode compartment of the cell.

FIG. 1 illustrates the first embodiment of the invention. The beginning aqueous phase 1 is transported through anode compartment 2 of the electrolytic cell 3 and is then transferred via line 4 into an extraction battery 5, where it is contacted with the extracting organic phase 6. Water or a dilute acid may be charged via line 7 into the same battery for stripping.

An aqueous raffinate 8 enriched in RE (III) and an organic phase 9 enriched in cerium (IV) exit the battery 5. The latter phase is transported through the cathode department 10 of the cell 3, with this compartment also being supplied via line 11 with the aqueous nitric phase.

The phase established in the compartment 10 is transferred through line 12 into a separator 13.

From the separator exits an aqueous phase 14, enriched in cerium (III), as well as an organic phase 15, which possibly could contain small amounts of cerium (III). To recover this cerium, the organic phase 15 is transferred through a mixer-decanter battery 16 countercurrently supplied via line 17 with water, or an aqueous acid solution. The aqueous phase, after separation via line 18, is combined with the phase 14, while the organic phase is recycled to the extraction step in the battery 5.

During the course of the electrolysis in cell 3, a small amount of $RE^{3+}$ ions may pass through the separator of the anode compartment into the cathode department, in which case it is then present in the solution 14.

This presence of RE with the cerium, even though very small, may nevertheless pose problems in certain subsequent uses of the cerium which require a very high purity.

To eliminate this problem, the invention includes a second variant of the embodiment shown in FIG. 1. This second variant, which is shown schematically in FIG. 2, comprises all of the stages of the variant of FIG. 1. For this reason, the same reference numerals are used in both Figures, to indicate like elements.

In contrast, a second electrolytic cell 19 is used having the structural characteristics described above. Furthermore, the organic phase 9 emanating from the extraction battery 5 is divided into two parts. The first part 20 A is directed into the cell 3, while the second part 20 B is charged into the cathode compartment 21 of the cell 19. This cathode compartment is also charged, via line 22, with an aqueous nitric phase of the previously described type. In addition, the aqueous phase enriched in cerium (III) is transferred into the anode compartment 23 of cell 19. An aqueous phase enriched in cerium (IV) is recovered at outlet 24.

The mixture formed in the compartment 21 is transferred, as in the first variant, through line 25 into a separator 26.

At outlet 27, an aqueous phase enriched in cerium (III) is recovered and this instance it is essentially free of RE (III).

In the same manner as in the particular variant shown in FIG. 1, prior to the recycling of the organic phase 28 emanating from the separator 26, stripping by water or an acid solution from line 29 may be carried out in the battery 30, together with the combination of the resulting aqueous phase in the line 31 with the phase in the line 27.

Figure 3:
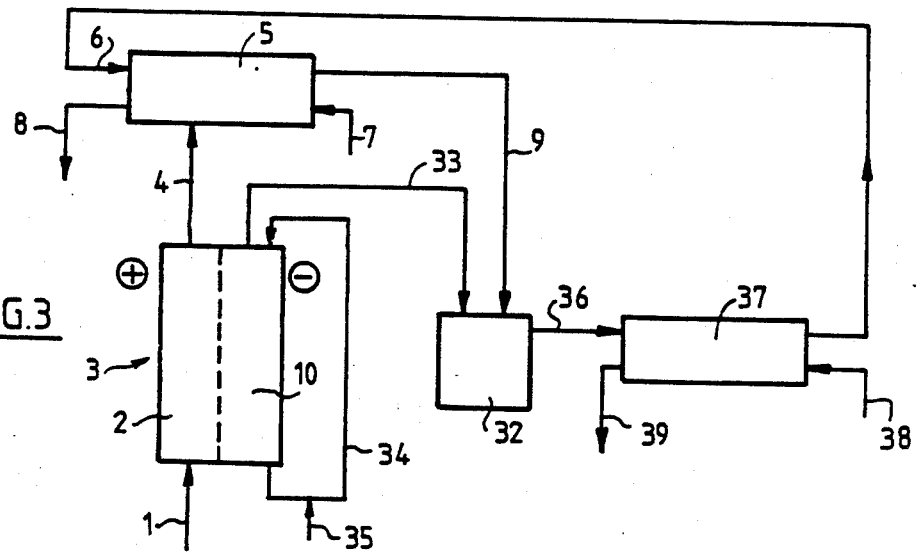
FIG. 3 is a schematic view of apparatus suitable for carrying out the second embodiment of the invention.

FIG. 3 illustrates a second embodiment of the invention.

This second embodiment also makes it possible to eliminate, quite simply, the problem arising from the embodiment of FIG. 1, i.e., the presence of $RE^{3+}$ ions with the cerium obtained upon completion of the process.

Again, the same reference numerals are used to indicate like elements that are common to both embodiments.

The organic phase enriched in cerium (IV) is conveyed into a reactor 32, where it is treated by the gaseous flowstream in line 33, enriched in $NO_x$. This flowstream emanates from cathode compartment 10 of the electrolytic cell 3 in which an aqueous nitric phase 34 is circulating, the titer whereof being adjusted by a feed supply 35.

The organic phase 36 is re-extracted in the battery 37 by water or dilute acid 38 and an aqueous phase 39 enriched in cerium (III) is obtained. The organic phase free of cerium is recycled for extraction in the battery 5.

Figure 4:
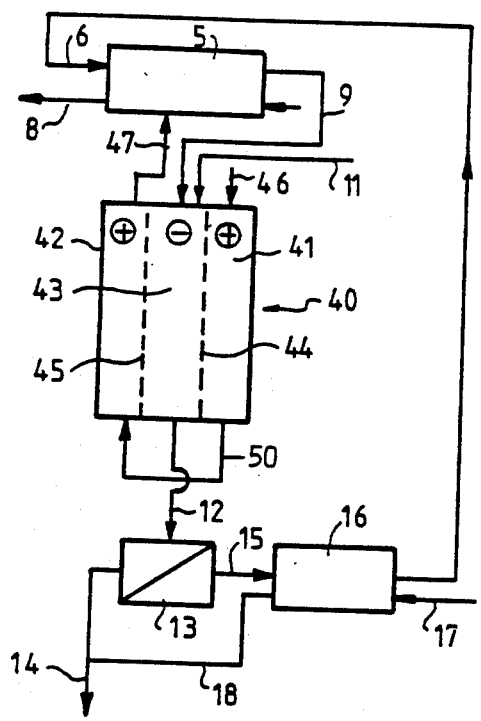
FIG. 4 is a schematic view of apparatus incorporating a particular type of electrolytic cell and useful in the first embodiment of the invention.
Figure 5:
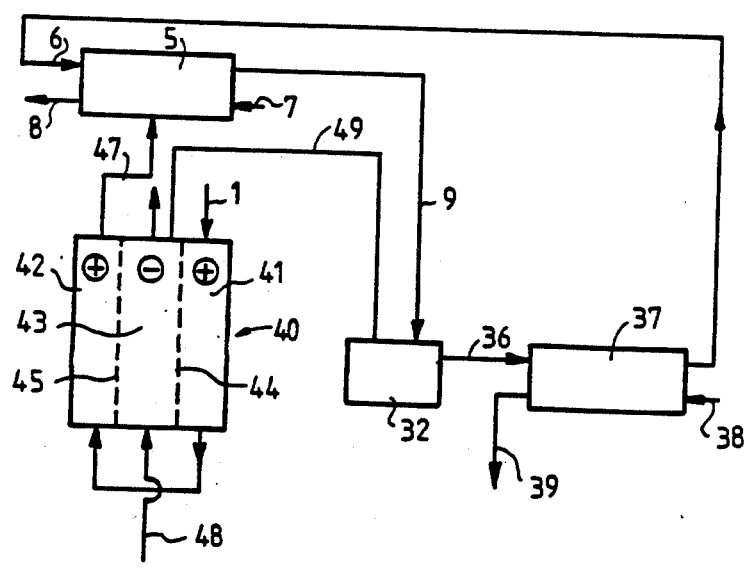
FIG. 5 illustrates the use of an electrolytic cell identical to that shown in FIG. 4, but in the second embodiment of the invention.

FIGS. 4 and 5 illustrate a special embodiment of the invention, based on the use of a specific electrolytic cell.

By virtue of this cell, a very high Faraday yield, in the vicinity of 100%, may be obtained for greater productivity, which is measured by the flow rate of the feed solution entering the system.

The particular cell has been described in published French Application No. 84/13,641.

As seen in FIGS. 4 and 5, the cell 40 consists of three compartments. The compartments 41 and 42 are anode compartments, between which a cathode compartment 43 is situated. These compartments are separated from each other by two cation membranes 44 and 45. These compartments are separated from each other by two cation membranes 44 and 45. As regards the particular structure of these compartments and the electrodes therein, reference is made to the description given hereinabove and the aforesaid published French patent application.

In the embodiment of FIG. 4, the initial aqueous solution 46 enriched in RE (III) and cerium (III) is transported into the first anode compartment 41 and then into the second anode compartment 42. Via line 47, an aqueous solution enriched in RE (III) and in cerium (IV) is withdrawn, which is subsequently extracted by the organic phase. The remainder of the process is carried out in a manner identical to that specifically described with respect to FIG. 1. The same reference numerals are again used. The center cathode compartment 43 is charged with aqueous nitric phase via line 11 and with organic phase emanating from the extraction via the line 9.

Figure 2:
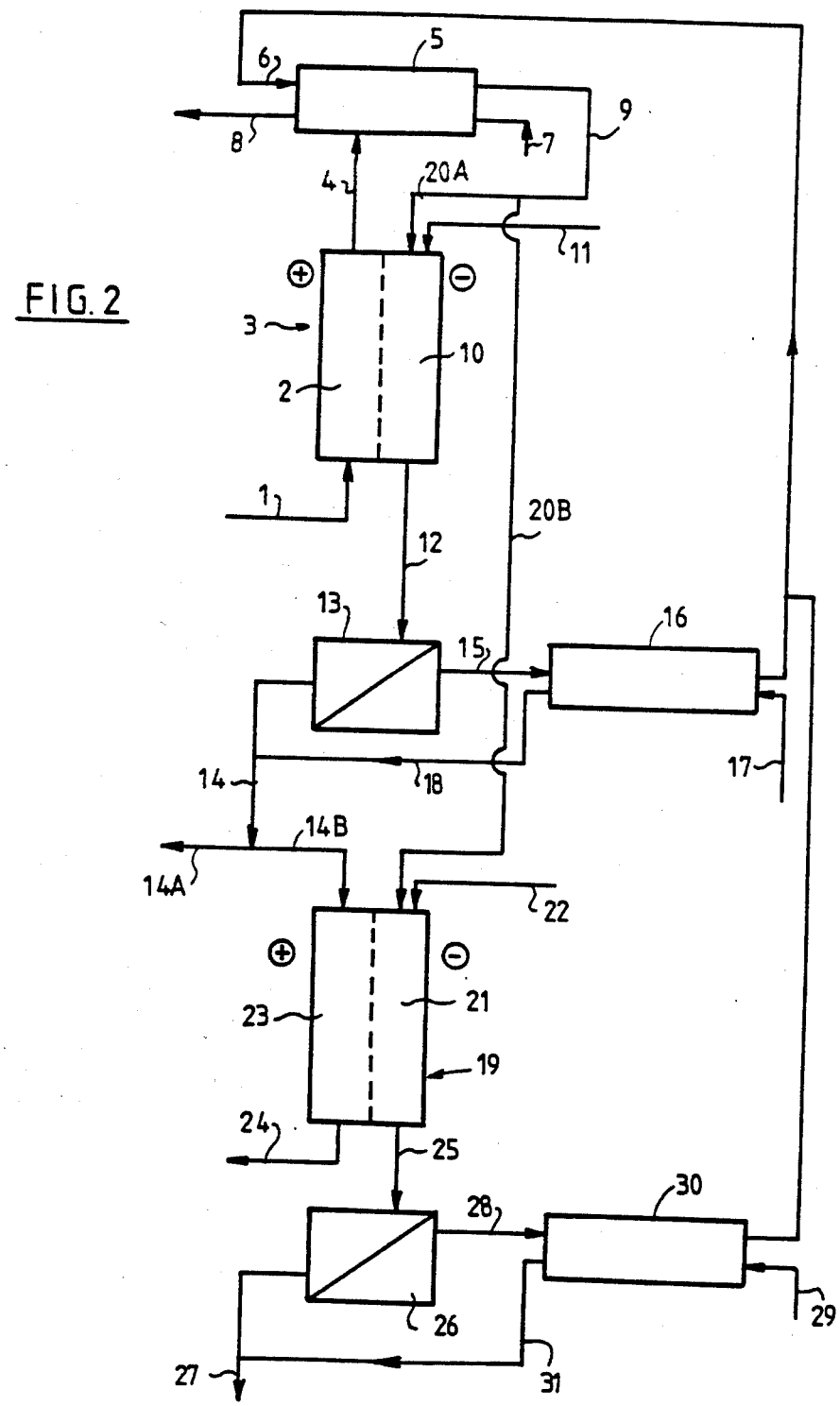
FIG. 2 is a schematic view of apparatus also suitable for carrying out the first embodiment of the invention, but in a second variant thereof.

Of course, it is entirely possible to carry out the embodiment of FIG. 2 by using, in place of cells 3 and 19, two cells having three compartments of the type described above. The conduits 20 A and 20 B shown in FIG. 2 respectively supply the center cathode compartment of each of the cells. The conduit 14 will successively supply each anode compartment of the second cell.

In the embodiment of FIG. 5, the initial aqueous phase 1 circulates in the same manner as described respecting FIG. 4. The center cathode compartment 43 is supplied with an aqueous nitric phase via line 48, whereby a gaseous phase enriched in $NO_x$ is created and supplied via line 49. The remainder of the process is identical to that described in connection with FIG. 3. Like reference numerals are again used.

In order to further illustrate the present invention and the advantages thereof, the following specific examples are given, it being understood that same are intended only as illustrative and in nowise limitative. In said examples to follow, the anodes were made of titanium coated with platinum, and the cathodes were solid titanium.

EXAMPLE 1

This example illustrates the embodiment shown in FIG. 2. The compositions and flow rates of the several flowstreams were as follows:

| Flowstream | Composition | Flow rate |
|---|---|---|
| 1 | RE (OT) oxides = 460 g/l<br>$CeO_2$ = 45%<br>$H^+$ = 1.7 N | 1360 l/hr |
| 4 | $[Ce^{4+}]/[Ce]$ total = 0.98 | 1360 l/hr |
| 6 | Tributylphosphate TBP = 70%<br>Dearomatized kerosene = 30% | 2.8 m³/hr |
| 8 | OT = 252 g/l<br>$CeO_2$/OT = 9 × 10⁻³ | |
| 20 A | | 2 m³/hr |
| 20 B | | 0.8 m³/hr |
| 11 | $HNO_3$ 1 N | 4 m³/hr |
| 17 | $H_2O$ | 400 l/hr |
| 14 A | $CeO_2$ = 45 g/l<br>$CeO_2$/OT ≧ 0.97<br>$H^+$ = 0.8 N | 2.7 m³/hr |
| 14 B | $CeO_2$ = 45 g/l<br>$CeO_2$/OT 0.97<br>$H^+$ = 0.8 N | 1.7 m³/hr |
| 22 | $HNO_3$ 1 N | 1.6 m³/hr |
| 24 | $CeO_2$ = 45 g/l<br>$[Ce^{4+}]/[Ce]$ total: 0.98<br>$CeO_2$/OT ≧ 0.97 | 1.7 m³/hr |
| 29 | $H_2O$ | 160 l/hr |
| 27 | $CeO_2$ = 45 g/l<br>$CeO_2$/OT ≧ 0.999<br>$H^+$ = 0.8 N | 1.76 m³/hr |

Operating conditions of the cells:

Cell 3:
Intensity: 71,200 A
Active surface: 3,560 dm²
Voltage: 3.5 V

Cell 19:
Intensity: 19,400 A
Active surface: 970 dm²
Voltage: 3.5 V
Faraday yield per cell, 60%
Purity of $CeO_2$, 99.9%
Battery: 5: 1 stage, no stripping
Batteries 16 and 30: 4 stages

EXAMPLE 2

This example illustrates the embodiment of FIG. 4:

| Flowstream | Composition | Flow Rate |
|---|---|---|
| 46 | OT = 460 g/l<br>$CeO_2$ = 45%<br>$H^{+2}$ = 1.7 N | 1360 l/hr |
| 6 | TBP = 70%<br>Dearomatized kerosene = 30% | 2.8 m³/hr |
| 8 | OT = 252 g/l<br>$CeO_2$/OT = 5 × 10⁻³ | 1360 l/hr |
| 11 | $HNO_3$ 5 N | 5.6 m³/hr |
| 17 | $H_2O$ | 280 l/hr |
| 14 | $CeO_2$ = 47 g/l<br>$CeO_2$/OT ≧ 0.97<br>$H^+$ = 4.8 N | 5.8 m³/hr |
| 47 | $[Ce^{4+}]/[Ce]$ total = 99% | 1360 l/hr |
| 50 | $[Ce^{4+}]/[Ce]$ total = 90% | 1360 l/hr |

Operating conditions of the cell:

Compartment 41:
$I_1$ = 38,800 A
$S_1$ = 1,940 dm²
Voltage = 3 V

Compartment 42:
$I_2$ = 3,850 A
$S_2$ = 1,940 dm²
Voltage = 2.2 V
Faraday yield, 95%
Purity of $CeO_2$ = 97%
Battery 5: 1 stage, no stripping
Battery 16: 4 stages

EXAMPLE 3

This example illustrates the embodiment of FIG. 5.

| Flowstream | Composition | Flow rate |
|---|---|---|
| 1 | OT = 460 g/l<br>$CeO_2$ = 45%<br>$H^{+2}$ = 1.7 N | 1360 l/hr |
| 7 | $H_2O$ | 50 l/hr |
| 8 | OT = 248 g/l<br>$CeO_2$/OT = 0.009 | 1410 l/hr |
| 48 | $HNO_3$ 6 N | 280 l/hr |
| 6 | TBP = 70% | 2.8 m³/hr |
| 38 | $H_2O$ | 825 l/hr |
| 39 | $CeO_2$/OT ≧ 0.999<br>$CeO_2$ = 334 g/l<br>$H^+$ = 1.9 N | 825 l/hr |

Operating conditions of the cell:

Compartment 41:
$I_1$ = 38,800 A
$S_1$ = 1,940 dm²
Voltage = 3 V

Compartment 42:
$I_2$ = 3,850 A
$S_2$ = 1,940 dm²
Voltage = 2.2 V
Faraday yield, 95%
Purity of $CeO_2$ = 99.9%
Battery 5: 2 stages, one extraction - one stripping
Battery 37: 9 stages While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for separating the cerium and rare earth values from an aqueous medium comprised thereof, which comprises (i) anodically electrolytically treating such aqueous medium and oxidizing the Ce (III) values therein to Ce (IV) values, (ii) extracting said electrolyzed aqueous medium with a selective organic extractant for said Ce (IV) values, and permitting the extracted medium to separate into an organic phase enriched in Ce (IV) values and a product aqueous phase enriched in rare earth values, (iii) reducing the Ce (IV) values in said organic phase to Ce (III) values and admixing same with an aqueous medium, and (iv) permitting said admixture to separate into an organic phase and a product aqueous phase enriched in Ce (III) values.

2. The process as defined by claim 1, wherein said step (iii) comprises cathodically electrolytically treating said organic phase in admixture with an aqueous nitric solution, and reducing the Ce (IV) values therein to Ce (III) values.

3. The process as defined by claim 1, wherein said step (iii) comprises
cathodically electrolytically treating an aqueous nitric solution and converting same into a $NO_x$-containing gas,
contacting said organic phase with said $NO_x$-containing gas, whereby the Ce (IV) values in said organic phase are reduced to Ce(III) values, the nitric solution being converted into a $NO_x$ containing gas prior to contacting said gas with said organic phase and thence admixing said reduced organic phase with the aqueous medium.

4. The process as defined by claim 2, further comprising separately anodically electrolytically treating at least a portion of said product aqueous phase and oxidizing the Ce (III) values therein to Ce (IV) values, individually cathodically electrolytically treating first and second fractions of said step (ii) Ce (IV)-enriched organic phase, both in admixture with an aqueous nitric solution, and reducing the Ce (IV) values in both to Ce (III) values, and permitting each admixture to separate into an organic phase and product aqueous phase enriched in Ce (III) values.

5. The process as defined by claim 2, further comprising recycling step (iv) organic phase to said organic extraction step (ii).

6. The process as defined by claim 4, further comprising recycling each final organic phase to said organic extraction step (ii).

7. The process as defined by claim 5, further comprising stripping said organic phase with an aqueous phase prior to the recycling thereof, and combining the strip water with said product aqueous phase.

8. The process as defined by claim 6, further comprising stripping each organic phase with an aqueous phase prior to the recycling thereof, and combining respective strip water fractions with respective product aqueous phases.

9. The process as defined by claim 2, said electrolytic treatments being carried out in an electrolytic cell comprising two anode compartments and a single cathode compartment, said beginning aqueous medium being successively transported through each anode compartment, and at least a portion of the Ce (IV)-enriched organic phase is transported through the cathode compartment thereof.

10. The process as defined by claim 3, further comprising recycling step (iv) organic phase to said organic extraction step (ii).

11. The process as defined by claim 3, said electrolytic treatments being carried out in an electrolytic cell comprising two anode compartments and a single cathode compartment, said beginning aqueous medium being successively transported through each compartment, and the $NO_x$ gas conversion being carried out in the cathode compartment thereof.

12. The process as defined by claim 1, said organic extractant comprising a phosphate, phosphonate, phosphinate, phosphine oxide, or sulfoxide.

13. The process as defined by claim 12, said organic extractant comprising an aliphatic or halogenated hydrocarbon diluent.

14. The process as defined by claim 12, said organic extractant comprising a trialkylphosphate.

15. The process as defined by claim 14, said organic extractant comprising tributylphosphate.

16. The process as defined by claim 2, said aqueous nitric solution comprising a solution of nitric acid or a nitrate.

17. The process as defined by claim 3, said aqueous nitric solution comprising a solution of nitric acid or a nitrate.

18. Apparatus for separating the cerium and rare earth values from an aqueous medium comprised thereof, which comprises (a) an anode/cathode electrolytic cell, (b) means for introducing such aqueous medium into the anode compartment of said cell, (c) means for extracting electrolyzed aqueous medium with an organic extractant, (d) means for introducing electrolyzed aqueous medium into said extracting means, (e) means for contacting an $NO_x$ gas with organic phase of extraction, (f) means for generating $NO_x$ gas in the cathode compartment of said cell, (g) means for transferring $NO_x$ gas from said cathode compartment into said contacting means, and (h) means for separating contacting means effluent into an organic phase and a product aqueous phase.

19. The apparatus as defined by claim 18, further comprising means for stripping organic phase effluent from said contacting means with an aqueous phase, and means for recycling stripped organic phase to said extracting means.

* * * * *